350-3.62 SR

XR 3,718,913

SEARCH ROOM

SUBSTITUTE FOR MISSING XR

Feb. 27, 1973 W. T. MALONEY ET AL 3,718,913

ERASABLE OPTICAL RECORDING SYSTEM

Filed April 6, 1972

United States Patent Office 3,718,913
Patented Feb. 27, 1973

3,718,913

ERASABLE OPTICAL RECORDING SYSTEM

William T. Maloney, Sudbury, and James B. Thaxter, Townsend, Mass., assignors to Sperry Rand Corporation, New York, N.Y.

Filed Apr. 6, 1972, Ser. No. 241,720
Int. Cl. G11c *13/02*
U.S. Cl. 340—173 CH 9 Claims

ABSTRACT OF THE DISCLOSURE

A method and apparatus of erasable optical recording wherein the apparatus comprises a sealed container filled with an electrolyte in which an anode and a cathode electrode are immersed, the anode being reactive with the electrolyte under a condition of applied direct current excitation while the cathode is essentially inert whereupon application of electrical excitation to the electrodes induces electrolytic action causing deposition of an oxide coating on the anode. Thereafter, with the electrical excitation removed, information is recorded on the oxide coating by light energy incident thereon causing vaporization of the coating at localized regions in proportion to the magnitude of the light intensity thereat for a given exposure time. Reapplying the electrical excitation causes erasure of the recorded information by depositing additional oxide coating material in the vaporized regions. Readout may be performed at any time between recording and erasing simply by illuminating the recorded coating in conventional manner with a readout optical beam.

BACKGROUND OF THE INVENTION

(1) Field of the invention

The present invention relates to a novel apparatus and method of optical data recording based on an electrolytic technique, wherein recording and erasing are performed respectively by selective vaporization of portions of an electrolytically deposited layer and restoration thereof by subsequent further electrolytic deposition.

(2) Description of the prior art

Extensive research has been conducted in recent years in the search for a commercially feasible optical recording medium providing a capability for facile recording and erasing of high density information as contained, for example, in conventional images or holograms. The primary requirements for such a recording medium are: (1) High sensitivity so that a suitable compromise may be effected between the intensity and time duration of the recording beam; (2) High resolution to permit high density recording; (3) Permanent storage without susceptibility to destruction from thermal or other environmental factors; (4) High efficiency readout with a comparatively low power beam; and (5) Easy erasibility to enable repetitive recording and erasing without development of ancillary detrimental effects.

Presently available recording media, including photochromics, thermoplastics, ferroelectrics, and magneto-optic and evaporated bismuth films have one or more deficiencies with respect to the enumerated requirements. Photochromic materials, for instance, are deficient with respect to permanence in that the recording deteriorates under ordinary ambient lighting and thermal conditions. Recordings on thermoplastic materials, on the other hand, exhibit good permanence but only under controlled thermal conditions and moreover are not easily and uniformly erasable which limits their performance with respect to repetitive writing and erasing. Ferroelectric recording media constructed of single crystals also have this limitation whereas multilayered ferroelectrics are limited by poor resolution. In the case of magneto-optic films low readout efficiency is the principal deficiency, while evaporated bismuth films have the disadvantage of not being reuseable which is also the principal disadvantage of ordinary photographic film. In view of the various limitations inherent in these materials, it is a principal object of the present invention to provide a simple, low-cost optical recording device capable of satisfactory performance with respect to all of the above noted requirements.

SUMMARY OF THE INVENTION

Optical recording apparatus constructed in accordance with the present invention comprises a planar shaped sealed container filled with an electrolytic solution in which a reactive anode and an inert cathode are immersed, both electrodes being coupled through the walls of the container to electrical leads adapted for connection to a source of direct current electrical excitation. The anode is preferably planar shaped and positioned proximate a generally coextensive light transmissive portion of the container so as to receive light propagated therethrough.

In use of the device for recording, a direct current external power source providing an electrical potential of predetermined amplitude is applied across the anode and cathode leads for a prescribed time interval to induce electrolytic action which results in the deposition of an oxide coating on the portion of the anode surface in contact with the electrolytic solution. The voltage amplitude is selected to produce a deposited layer thickness which is strongly absorptive to the light wavelength intended to be used for recording. Thereafter, with the electrical excitation decoupled or reduced to zero, information is recorded in the electrolytically deposited layer by light energy directed thereon through the light transmissive portion of the container. The information may be recorded holographically by interference between a pair of light beams in which case, at the regions of constructive interference where the light is intense, the deposited layer is destroyed by melting or vaporization caused by the heat energy of the light while at the regions of destructive interference, the deposited layer remains unaffected. Alternatively, the recording may be produced by a single light beam of sufficient intensity to cause destruction of the deposited layer in varying degrees at localized regions in proportion to the light energy received. This method is useful, for instance, for recording digital data where a ZERO may be represented by a non-destructed region and a ONE by a destructed region.

In the case of both the holographic and conventional single beam recording, readout is performed merely by illuminating the recording medium with a readout beam. For the holographic recording, a readout beam of the same wavelength directed so that its specular reflection propagates oppositely to the reference beam used in recording produces an image of the recorded object in the usual manner at the location occupied by the object during recording. In the case of the single beam recording, the readout beam has one or the other of two unique phase relations to some arbitrary reference beam depending on whether the readout beam is incident on a destructed or non-destructed region of the recording medium. Naturally occurring interference in the oxide layer affords the possibility of amplitude readout also. In either case, it will be understood that inasmuch as the readout is phase dependent, the electrolytic solution must have a refractive index value different from the refractive index of the electrolytically deposited layer. Otherwise, solution flowing into the vaporized data recorded regions would impair the readout.

Erasure of the recorded data is accomplished simply by reapplying the electrical excitation of predetermined voltage amplitude across the anode and cathode for a brief instant. This has the effect of filling in the vaporized regions of the deposited layer with new electrolytically deposited material without affecting the overall thickness of the other regions of the coating. For satisfactory operation of the device, it will be appreciated that it is important to avoid any dimpling of the deposited layer which would evantually impair repetitive read-write cycling. For this reason, it is necessary to control the intensity of the recording beam in accordance with the length of time it is applied in order to limit the recording energy so as to preclude vaporization penetrating beyond the thickness of the deposited layer and attacking the underlying anode. This is easily accomplished simply by maintaining an appropriate inter-relationship between the deposited layer thickness and the intensity and time duration of the recording beam.

DESCRIPTION OF THE PREFERRED EMBODIMENT

Figure 1B:
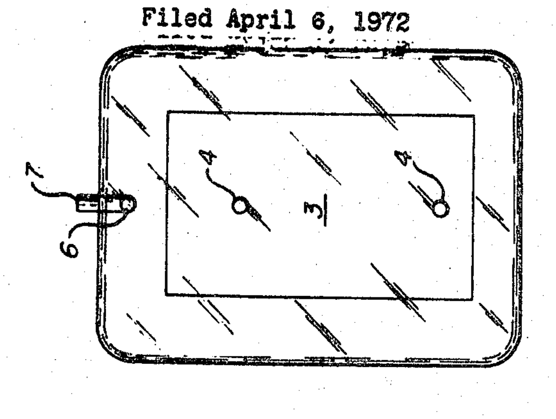
FIG. 1*b* is a rear view of the electrolytic cell used in the apparatus of FIG. 1*a*.
Figure 1A:
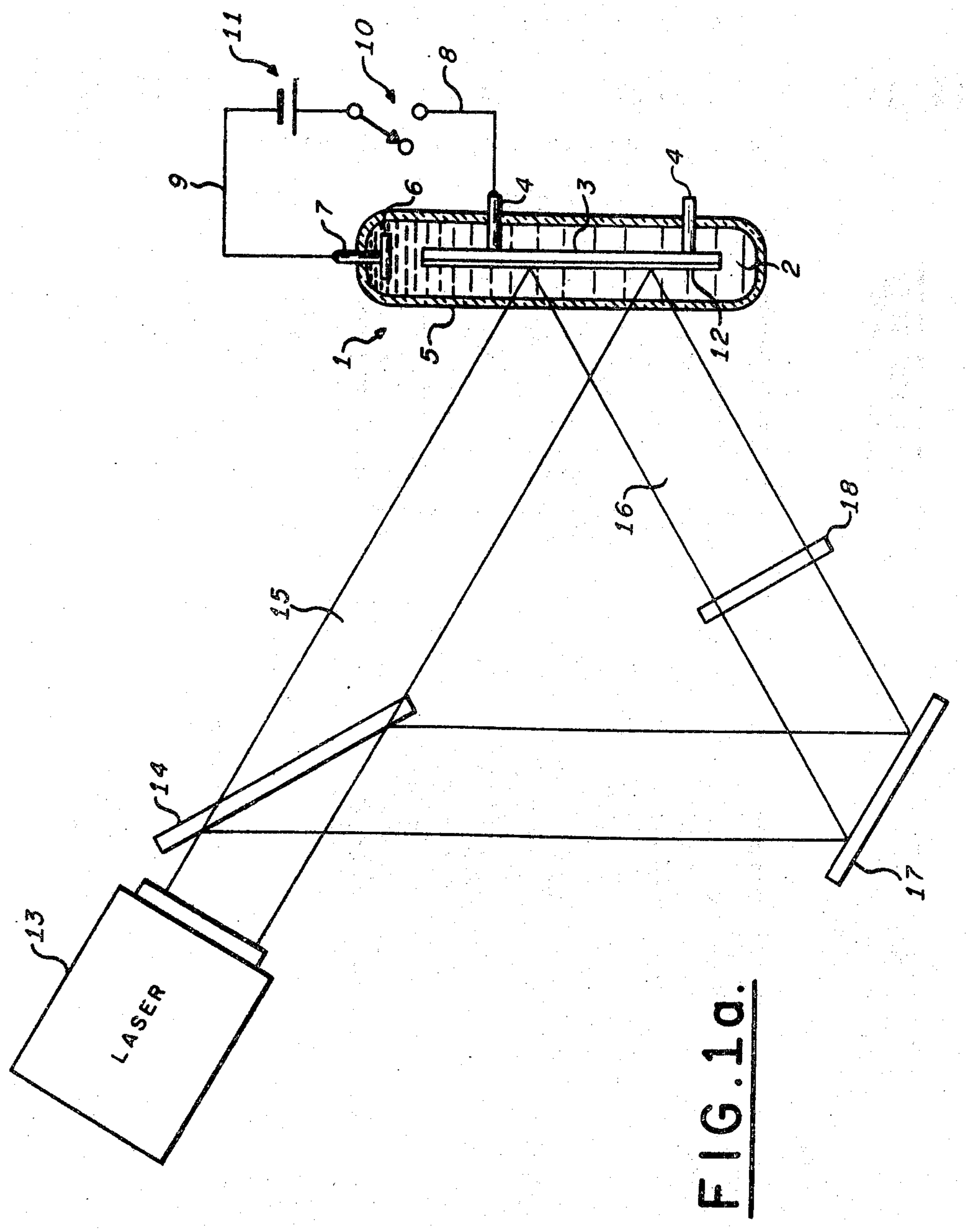
FIG. 1 is a side schematic view of a preferred holographic recording apparatus incorporating an electrolytic cell in accordance with the principles of the present invention.

Referring to the figures, a sealed glass container 1 of generally planar square or rectangular configuration is filled with an electrolytic solution 2. A planar anode element 3 is supported in the electrolytic fluid by pins 4 connecting through the rear wall of the container such that the front planar surface of the anode is proximate the front face 5 of the container. A cathode element 6 is secured by a pin 7 passing through the side wall of the container so as not to obstruct the front surface of the anode. Electrical leads 8 and 9 are connected to the anode and cathode support pins, respectively, for applying electrical excitation to the electrodes, lead 8 being coupled through switch 10 to the positive terminal of variable voltage source 11 and lead 9 being coupled directly to the negative terminal of the voltage source. It will be apparent to those skilled in the art that the electrodes may alternatively be pin-shaped members extending through the walls of the container for connection to the voltage source so that only part of each electrode is actually immersed in the electrolyte. In addition, it will be recognized that the anode may be a metallic member or a metallic layer coated on an electrically non-conductive substrate constructed of glass or other suitable material.

Preparatory to using the device for recording, the voltage source is adjusted to provide a voltage of appropriate amplitude and switch 10 is closed to apply electrical excitation across the anode and cathode elements. As a consequence of this action, a thin anodic layer is formed on the anode surface area which is in contact with the electrolyte in accordance with the well known process of electrolytic deposition or anodization. Satisfactory operation has been achieved by the use of a carbon or platinum cathode and a tantalum anode in a dilute solution of borax and boric acid. The carbon or platinum cathode is chemically inert with respect to the electrolytic solution while the tantalum anode is able to react chemically upon application of the voltage. Each electrode typically acquires a thin oxide coating from normal atmospheric exposure prior to being inserted in the solution. Upon applying the electric potential to the electrodes in the solution, the thickness of the oxide coating on the anode is increased in proportion to the magnitude of the applied voltage. This results from the following action. The applied potential establishes a high electric field intensity on the order of $10^6$ volts per meter in the oxide coating, or in the region of the electrolytic solution adjacent the anode, causing positive tantalum ions to migrate from the anode toward the electrolyte while simultaneously negative oxygen ions move from the electrolyte toward the anode. These oppositely charged ions react to deposit a metal oxide layer on the surface of the anode. As the thickness of the deposited layer increases, the field intensity thereacross proportionately decreases and thereby acts to impede the reaction so that an essentially stabilized or equilibrium condition is achieved after a short time on the order of a minute or so with an applied potential of about 100 volts. The concentrations of the borax ($Na_2B_4O_7$) and boric acid ($H_3BO_3$) are preferably about 100 g./l. and 30 g./l. in water, respectively. This electrolyte is preferred because it does not attack the metal oxide formed by the electrolytic reaction.

The above-described setup has been found to produce a deposited oxide layer on the anode which can be made highly absorptive to light at a wavelength of .633 micron provided by the standard pulsed ruby laser. The voltage level which produces the appropriate thickness for the anode layer may be ascertained experimentally by illuminating the surface of the deposited layer with white light directed through the front face of the container and slowly varying the applied voltage to observe when the reflected light becomes predominantly blue-green in color, an indication of strong absorption of the red component of the illuminating white light. Once the voltage level corresponding to absorption of a particular wavelength has been determined, that voltage may be used repeatedly to produce a deposited layer of appropriate thickness without the necessity for subsequent illumination with white light and concomitant observation of the color of the reflected light. The essential point to be noted is that a predetermined voltage applied for at least some minimum length of time produces a deposited layer of a prescribed thickness which will be highly absorptive to a discrete wavelength. The total length of time for which the voltage is applied is inconsequential as long as it is applied for at least the minimum prescribed time required for the reaction to reach equilibrium. Moreover, by applying a voltage of different magnitude, a deposited layer of different thickness can be produced to be absorptive to a different wavelength in the event it is desired to use a recording beam source other than the ruby laser.

After the deposited layer has been formed to the desired uniform thickness in the afore-described manner, switch 10 is opened so that optical data may be recorded by exposing the deposited layer to a light beam or beams providing sufficient intensity to melt or vaporize localized regions of the coating in accordance with the degree of heat energy thereat. Thus, in the case of holographic recording, a high intensity collimated light beam from a pulsed ruby laser 13 is directed by beamsplitter 14 to produce reference and signal beams 15 and 16, respectively, the former being transmitted directly through the front face of container 1 onto the deposited anode layer 12 while the latter is directed by reflection from mirror 17 through data transparency 18 to impinge on the deposited layer in substantially superposed relation with the reference beam. At the localized regions of constructive interference where the reference and signal beams are in phase, the total light intensity thereat causes vaporization of the deposited layer. At other regions, partial vaporization occurs in accordance with the relative phase of the reference and signal beams, while at the points of destructive interference where the light intensity is essentially zero, the deposited layer remains unaffected. In this way, a pure phase hologram is produced directly without the need for any further processing. The electrolytic solution obviously flows so as to fill in the voids created by the vaporization and for this reason the refractive index of the solution must be different from that of the deposited layer, otherwise the phase characteristic of the hologram would be destroyed. Preferably, the refractive index of the electrolyte should be different from that of the deposited layer by as large a factor as possible to assure good reproduction of the holographic image upon readout with a minimum depth of vaporization of the oxide layer. In the case of the above mentioned materials, for example, the refractive index of the electrolyte is about 1.3 while that of the tantalum oxide layer is about 2.7. It will be apparent to those skilled in the art that multiple holograms may be recorded by the use of conventional holographic multiplexing techniques. Care must be exercised though, as previously explained, to assure that the recording beams do not vaporize any portion of the anode itself, so that the erasing procedure may be effectively implemented as will be explained momentarily. First, however, it will be appreciated that readout of the stored data can be performed in a conventional manner simply by illuminating the deposited layer with a reference beam of the same wavelength directed so that its specular reflection propagates oppositely to the reference beam used in recording, whereupon an image of the transparency will be formed near the location originally occupied by the transparency.

Erasure of the optically recorded data is performed simply by closing switch 10 to reapply the predetermined voltage from source 11. This causes further electrolytic action in a manner to fill in the vaporized portions of the deposited layer without adding to the overall thickness of the layer. As previously explained, the overall thickness of the deposited layer will be affected only if the voltage amplitude is changed to a different level or if the recording process had caused vaporization of portions of the anode as well as the deposited layer. In the latter case, the top surface of the erased layer will have the same dimpled pattern as was inscribed in the anodes by the recording beams, that is the deposited layer develops to the same thickness at all points with respect to corresponding underlying anode surface points.

The invention may also be used for recording with a single light beam. For instance, digital data can be recorded by deflecting the laser beam sequentially through a plurality of linearly or two-dimensionally arrayed positions. At each position the laser may be pulsed on to indicate a digital 1 or can be maintained in an off state to indicate a digital zero. Readout would be accomplished simply by deflecting a similar beam to each position and observing the phase of the reflected light relative to some reference beam preferably obtained from the same laser source. As a consequence of the vaporization associated with a digital 1, the related readout beam would have one phase relation to the reference beam while the readout beam associated with the digital zeros, where no vaporization occurred, would have another phase relation to the reference beam. This requires again, of course, that the refractive index of the electrolyte be different from that of the deposited layer.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Optical recording apparatus comprising:
container means,
an electrolytic solution in said container means,
at least a pair of electrodes each at least partially immersed in said electrolytic solution,
means for optionally applying direct current electrical excitation across said electrodes to cause electrolytic action which provides on one of the electrodes a deposited layer having a refractive index different from the refractive index of the electrolytic solution, and means including a light source for directing light energy onto said deposited layer under an electrically de-energized condition of the electrodes to cause vaporization of the layer at localized regions in proportion to the light intensity thereat.

2. The apparatus of claim 1 wherein the applied electrical excitation is of predetermined amplitude and applied for a prescribed time interval to enable the electrolytic action to reach a substantially stabilized condition.

3. Optical recording apparatus comprising:
container means,
an electrolytic solution in said container means,
first and second electrodes each at least partially immersed in the electrolytic solution, said first electrode including a metallic element which is reactive with the electrolytic solution under a condition of direct current flow therethrough,
means including a source of direct current electrical energization for optionally applying voltage across the electrodes to produce electrolytic action wherein a coating is formed on said first electrode, said coating having a thickness proportional to the magnitude of the applied voltage and a refractive index different than the refractive index of the electrolytic solution, and
means including a light source for directing light energy onto said coating under a de-energized condition of the electrodes to cause vaporization of the coating at localized regions in proportion to the magnitude of the light intensity thereat.

4. The apparatus of claim 3 wherein the second electrode is constructed of material which is inert with respect to the electrolytic solution under a condition of applied voltage across the electrodes.

5. The apparatus of claim 4 wherein the container is sealed and filled with the electrolytic solution and the first electrode has a planar shape.

6. A method of optical recording comprising the steps of:
providing a container holding an electrolytic solution in which a pair of electrodes are each at least partially immersed,
applying direct current electrical excitation across the electrodes to induce electrolytic action for forming on one of the electrodes a coating having a refractive index different than the refractive index of the electrolytic solution,
removing the electrical excitation from the electrodes, and
directing light energy on to the coating to cause vaporization thereof at localized regions in proportion to the intensity of the light thereat.

7. The method of claim 6 further including the step of reapplying the electrical excitation to fill in the vaporized portions of the coating with new electorlytically deposited coating material.

8. The method of claim 6 including the step of illuminating the coating with a light beam to read out the data recorded thereon by localized vaporization.

9. The method of claim 8 including the step of reapplying the electrical excitation to fill in the vaporized portions of the coating with new electrolytically deposited coating material.

References Cited

UNITED STATES PATENTS 3,060,317 10/1962 Winogradoff ---- 340—173 CH

TERRELL W. FEARS, Primary Examiner

U.S. Cl. X.R.

346—74 CH; 219—216 L; 96—1 R